United States Patent [19]
Yamakawa et al.

[11] Patent Number: 5,751,679
[45] Date of Patent: May 12, 1998

[54] HOLOGRAM FORMED ON AN OBJECTIVE LENS FOR ONE DEFRACTING LIGHT BEAMS WHICH ARE SEPARATED BY MORE THAN ONE TRACK WIDTH

[75] Inventors: Akio Yamakawa, Kanagawa; Masamichi Utsumi, Chiba, both of Japan

[73] Assignee: Sony Corporation, Japan

[21] Appl. No.: 694,262

[22] Filed: Aug. 8, 1996

[30] Foreign Application Priority Data

Aug. 11, 1995 [JP] Japan ............................. 7-226068

[51] Int. Cl.⁶ .......................................... G11B 7/12
[52] U.S. Cl. .................. 369/103; 369/44.23; 369/112; 369/44.37
[58] Field of Search ........................ 369/103, 109, 369/110, 112, 44.23, 107, 44.37

[56] References Cited

U.S. PATENT DOCUMENTS

| | | | |
|---|---|---|---|
| 5,416,765 | 5/1995 | Aikoh et al. | 369/44.23 |
| 5,446,565 | 8/1995 | Komma et al. | 369/103 |
| 5,523,993 | 6/1996 | Freeman | 369/103 |
| 5,526,338 | 6/1996 | Hasman et al. | 369/112 |

*Primary Examiner*—David C. Nelms
*Assistant Examiner*—Kim-Kwok Chu
*Attorney, Agent, or Firm*—Ronald P. Kananen

[57] ABSTRACT

An optical pickup and a reproducing apparatus includes an objective lens having a hologram lens formed over the entire area of one surface thereof. A central portion of the hologram lens and peripheral portions of the hologram lens are formed differently, so that a laser beam diffracted by the central portion of the hologram lens is focused at plane A, and a laser beam diffracted by the peripheral portion is directed outward. As a result of this, the light intensity distribution after light has passed through the objective lens becomes substantially uniform, so that almost no primary ring is produced, thus preventing cross talk caused by reflected light from an adjacent track.

10 Claims, 5 Drawing Sheets

FIG. IA
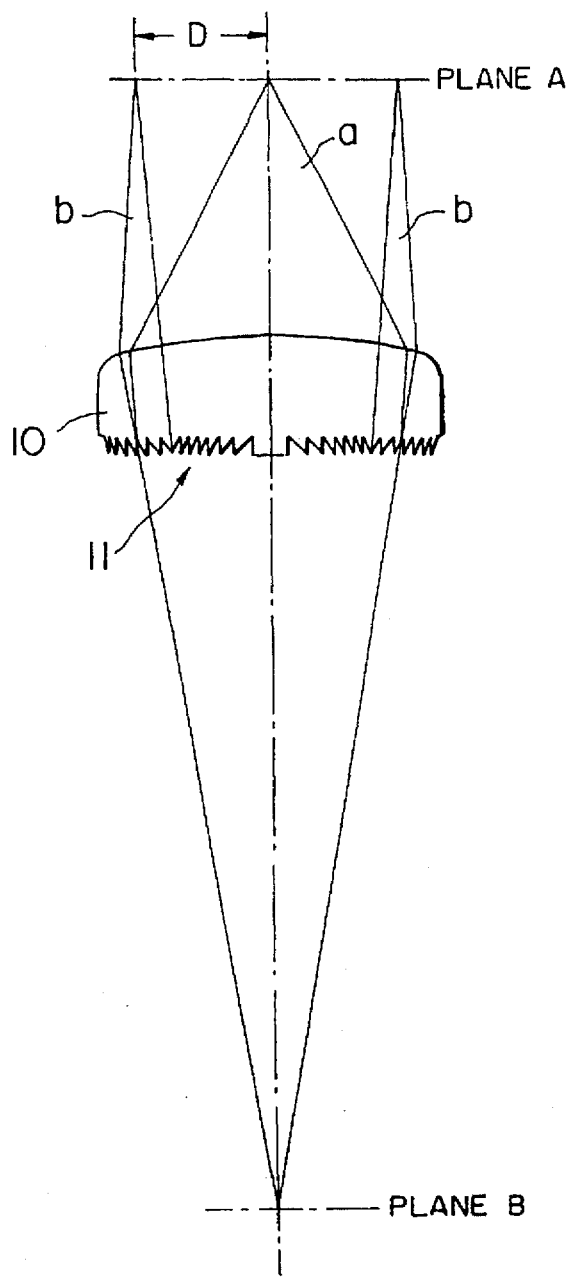
FIG. IB
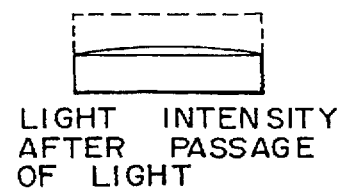
LIGHT INTENSITY
AFTER PASSAGE
OF LIGHT
FIG. IC
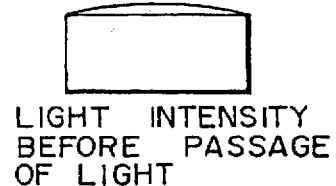
LIGHT INTENSITY
BEFORE PASSAGE
OF LIGHT

LIGHT INTENSITY AFTER PASSAGE OF LIGHT THROUGH OBJECTIVE LENS

LIGHT INTENSITY BEFORE PASSAGE OF LIGHT THROUGH OBJECTIVE LENS

PRIMARY RING

LIGHT INTENSITY

PRIMARY RING

PRIMARY RING

HOLOGRAM FORMED ON AN OBJECTIVE LENS FOR ONE DEFRACTING LIGHT BEAMS WHICH ARE SEPARATED BY MORE THAN ONE TRACK WIDTH

BACKGROUND OF THE INVENTION

1. Field of the Invention

The present invention relates to an optical pickup and a reproducing apparatus for reading out and reproducing data from an optical disk or the like.

2. Description of the Related Art

A description will now be given of a construction of a conventional optical pickup for reading out data from an optical disk, with reference to FIG. 4.

Referring to FIG. 4, a laser beam generated from a laser diode 8 is reflected by a half mirror 5 and directed to a collimating lens 4. The laser beam, formed into a parallel beam by the collimating lens 4, enters an objective lens 2 that focuses the laser beam on an optical disk having pits formed in correspondence with recording data. Thereafter, the light beam, illuminating the optical disk 1, is reflected in correspondence with the pits, and is directed to the objective lens 2 where the light beam is gathered and formed into a parallel beam that enters the collimating lens 4.

In the optical path opposite the aforementioned path taken by the laser beam, the laser beam passes through the half mirror 5, enters a concave lens 6, and is focused onto an optical detector 7 comprising four divisions. The signals of the optical detector comprising four divisions are synthesized to allow reproduction of RF reproduction signals in accordance with the data recorded on the optical disk 1.

A lens with a hologram lens 3 (see FIG. 4) has been proposed as a type of lens to be used as the objective lens 2. FIG. 5 is an enlarged view of the objective lens 2, in which the component parts other than the objective lens 2 are not shown.

Referring to FIG. 5, plane A is the plane where the optical disk 1 is disposed, while plane B is an image plane where the optical detector 7 is disposed. The hologram lens 3 is formed on the image plane or plane B side of the objective lens 2, and only at the central portion of the surface of the objective lens 2.

The hologram lens 3 appear s substantially sa w-toothed in cross section, as shown in FIG. 5, whereas it appears as a plurality of concentric rings as viewed in the direction of formation of the hologram lens 3, as shown in a front view of the objective lens 2 of FIG. 8.

In the objective lens 2 with a hologram lens as that shown in FIG. 5, however, the light intensity distribution before the laser beam passes through the objective lens 2 is substantially uniform, as illustrated in FIG. 6B, but the light intensity distribution after the laser beam has passed through the objective lens becomes nonuniform in that the light passing through the hologram lens 3 alone has reduced intensity, while the light passing through both ends of the objective lens 2 has high intensity, as shown in FIG. 6A. The light intensity distributions illustrated in FIGS. 6A and 6B are those for the objective lens shown in cross section. The light intensity distribution for light passing through the ends of the hologram of the objective lens as viewed from above is annular in form.

Such a light intensity distribution results because when the hologram lens 3 focuses the light by diffraction, only zero-order diffraction light is focused, so that diffraction light with a light order greater than 1 is not focused.

The light intensity distribution for light focused onto the optical disk 1 by the objective lens 2 is shown in FIGS. 7A and 7B. In FIG. 7A showing the light intensity distribution for light focused onto the optical disk 1, a highly intense spot of light is formed at the center of a primary ring, which also has high intensity. FIG. 7B, being a graph showing the light intensity distribution for light focused on the optical disk 1 in terms of height, shows that the center spot of light has high intensity, and the annular primary ring has relatively high intensity.

When data is read out from the optical disk 1, the highly intense center spot of light is focused on a pit formed in accordance with the recorded data to be read out on a track of the optical disk 1 in order to read out the data from the track. In this case, the laser beam producing the primary ring falls upon an adjacent track pit, resulting in the problem of cross talk caused by reflected light from the adjacent track.

SUMMARY OF THE INVENTION

Accordingly, an object of the present invention is to provide an optical pickup and a reproducing apparatus in which cross talk does not occur, even when an objective lens with a hologram lens is used.

To this end, there is provided according to one aspect of the present invention, an optical pickup, comprising at least: an objective lens for focusing light generated by a light source and illuminating a reading out member containing data to be read out, and directing the light reflected by the reading out member; wherein the objective lens comprises a hologram lens formed over the entire area of one surface thereof, with a central portion of the hologram lens being formed such that light incident upon the central portion of the hologram lens is focused by the objective lens in such a manner as to illuminate a reading location of the reading out member, and light reflected by the reading out member is incident upon the objective lens; and with a peripheral portion of the hologram lens being formed such that light incident upon the peripheral portion of the hologram lens illuminates a location on the reading out member other than the reading location of the reading out member, and the light reflected by the reading out member is not incident upon the objective lens.

In the optical pickup, the hologram lens may be formed on a surface of the objective lens facing the light source.

In addition, in the optical pickup, the hologram lens may be formed on a surface of the objective lens facing the reading out member.

Further, in the optical pickup, the hologram lens may be formed by a plurality of concentric grooves, each of which being defined by a pair of walls, of which one is inclined, such that a direction of inclination of the inclined wall of each of the grooves formed in the central portion of the hologram lens is opposite to a direction of inclination of the inclined wall of each of the grooves formed in the peripheral portion of the hologram lens.

Further, in the optical pickup, the hologram lens may be formed by a plurality of concentric grooves, each of which being defined by a pair of walls, of which one is inclined, such that a depth of the inclined wall of each of the grooves formed in the central portion of the hologram lens differs from a depth of the inclined wall of each of the grooves formed in the peripheral portion of the hologram lens.

According to another aspect of the present invention, there is provided a reproducing apparatus, comprising at least: an optical pickup for focusing light generated from a light source and illuminating an optical disk, and receiving the light reflected by the optical disk; wherein the optical pickup has an objective lens comprising a hologram lens formed over the entire area of one surface thereof, with a central portion of the hologram lens being formed such that when light incident upon the central portion of the hologram lens is focused by the objective lens and illuminates a reading location on the optical disk, the light reflected by the optical disk is incident upon the objective lens; and with a peripheral portion of the hologram lens being formed such that when light incident upon a peripheral portion of the hologram lens illuminates a location other than the reading location on the optical disk, the light reflected by the optical disk is not incident upon the objective lens.

In the reproducing apparatus, the hologram lens may be formed on a surface of the objective lens facing the light source.

In addition, in the reproducing apparatus, the hologram lens may be formed on a surface of the objective lens facing the optical disk.

Further, in the reproducing apparatus, the hologram lens may be formed by a plurality of concentric grooves, each of which being defined by a pair of walls, of which one is inclined, such that a direction of inclination of the inclined wall of each of the grooves formed in the central portion of the hologram lens is opposite to a direction of inclination of the inclined wall of each of the grooves formed in the peripheral portion of the hologram lens.

Further, in the reproducing apparatus, the hologram lens may be formed by a plurality of concentric grooves, each of which being defined by a pair of walls, of which one is inclined, such that a depth of the inclined wall of each of the grooves formed in the central portion of the hologram lens differs from a depth of the inclined wall of each of the grooves formed in the peripheral portion of the hologram lens.

According to the optical pickup and reproducing apparatus of the invention, light entering a peripheral portion of the hologram lens and reflected by the optical disk is not incident upon the optical lens, so that the light intensity distribution for light that has passed through the objective lens is substantially uniform, thus preventing a primary ring from being produced.

Thus, it is possible to prevent cross talk caused by reflected light from an adjacent track.

BRIEF DESCRIPTION OF THE DRAWINGS

FIG. 1A illustrates a construction of an objective lens in an embodiment of an optical pickup in accordance with the present invention; FIG. 1B shows the light intensity distribution before light has passed through the objective lens; and FIG. 1C shows the light intensity distribution after light has passed through the objective lens.

DESCRIPTION OF THE PREFERRED EMBODIMENTS

Figure 4:
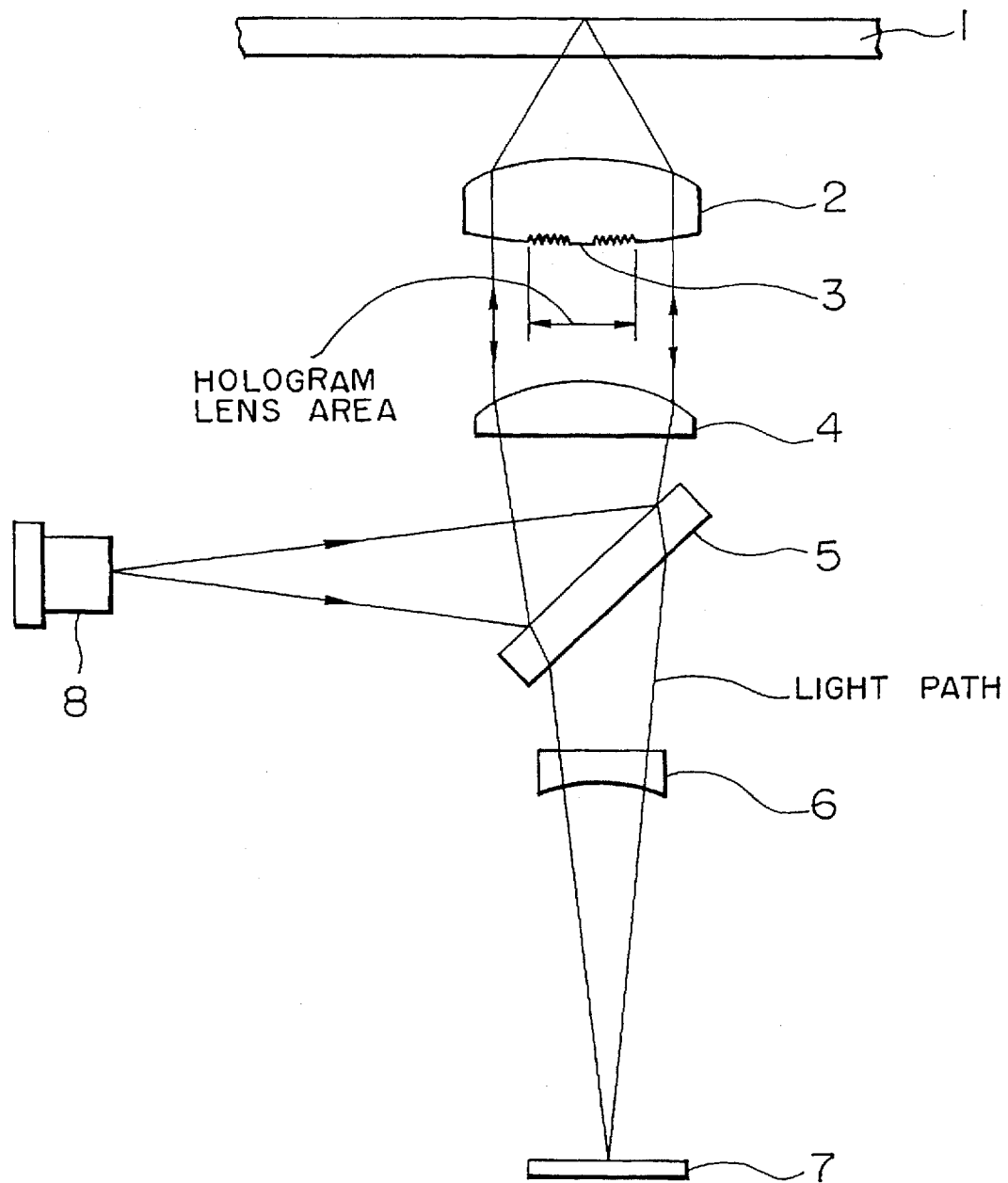
FIG. 4 illustrates a construction of a conventional optical pickup.

A form of an objective lens in an embodiment of an optical pickup in accordance with the present invention is shown in FIG. 1. Although only the objective lens of the optical pickup is shown, the optical pickup may be constructed, for example, as illustrated in FIG. 4, and arranged accordingly.

Referring to FIG. 1, plane A is the plane where an optical disk 1 is disposed, while plane B is an image plane where an optical detector 7 is disposed. A hologram lens 11 is formed on an image plane or plane B side of an entire surface of an objective lens 10.

Figure 5:
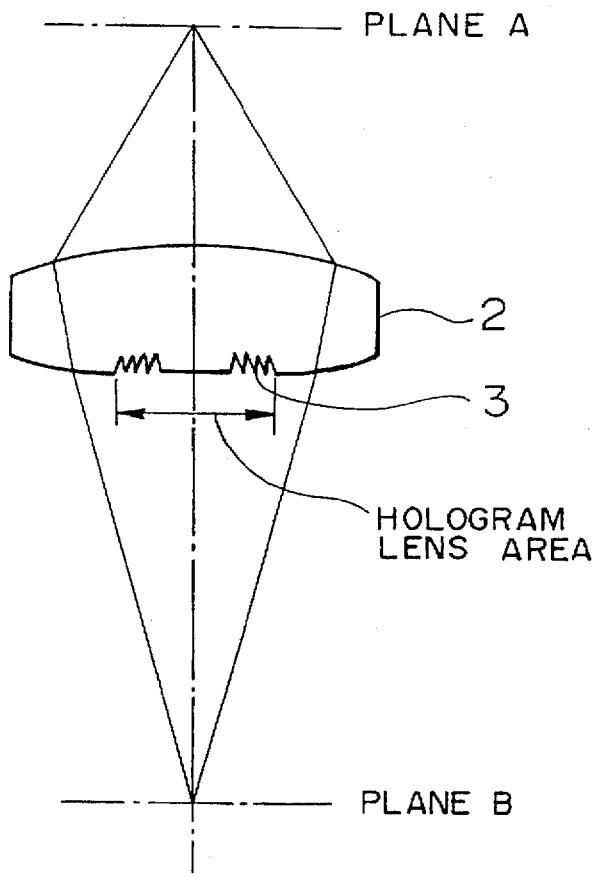
FIG. 5 illustrates a construction of an objective lens in the conventional optical pickup.
Figure 6A:
FIG. 6A illustrates light intensity distribution before light has passed through the objective lens in the conventional optical pickup.
Figure 6B:
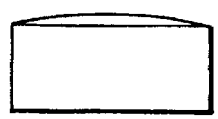
FIG. 6B illustrates light intensity distribution after light has passed through the objective lens in the conventional optical pickup.
Figure 7A:
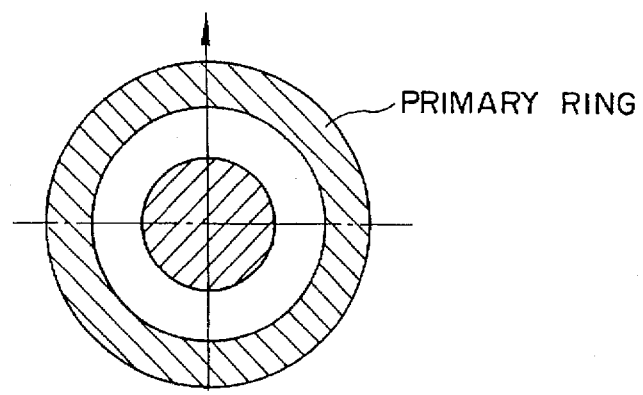
FIG. 7A shows light intensity distribution at a plane of a focal point of the objective lens in the conventional optical pickup.
Figure 7B:
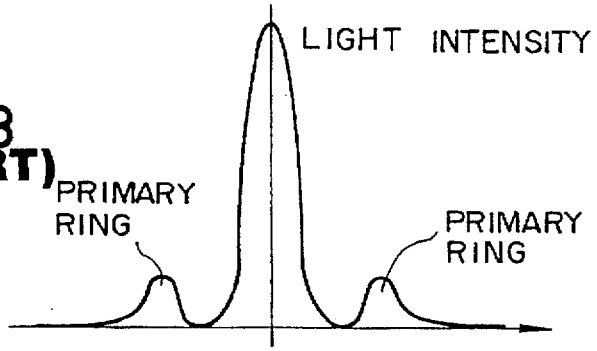
FIG. 7B is a graph of the light intensity distribution.
Figure 8:
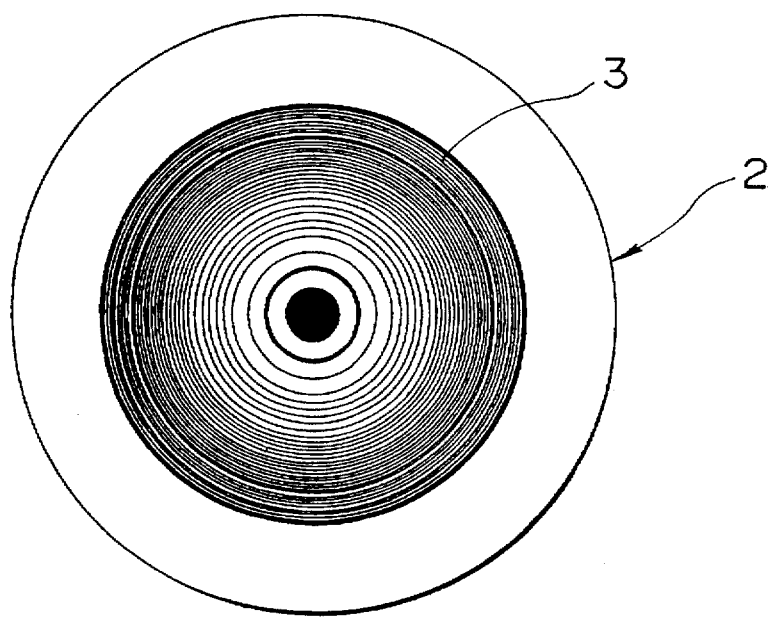
FIG. 8 is a front view of the objective lens with a hologram lens.

The hologram lens in cross section appears substantially saw-toothed, as illustrated in FIG. 5, whereas it appears like a plurality of concentric annular grooves as viewed in the direction of formation of the hologram lens 11.

The central portion of the hologram lens 11 focuses light differently from the peripheral portion of the hologram lens 11.

Of the light beams that are incident to the objective lens 10, the light beam that is diffracted by the central portion of the hologram lens 11 is focused onto the optical disk 1 disposed at plane A, as indicated by light beam a in the figure. On the other hand, the light beams that are diffracted by the peripheral portions of the hologram lens 11 illuminate the optical disk 1, as indicated by light beams b in the figure. In this case, the laser beams b illuminate the optical disk 1 so that they are separated by a distance D from a point the laser beam a is focused.

When the objective lens 10 has a hologram lens 11, the light intensity distribution before light has passed through the objective lens 10 is substantially uniform, as illustrated in FIG. 1C, whereas the light intensity distribution after light has passed through the objective lens 10 is as a whole reduced, but stays substantially uniform, as illustrated in FIG. 1B.

Figure 2A:
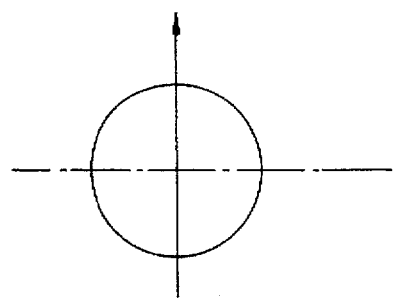
FIG. 2A shows the light intensity distribution at a plane of a focal point of the objective lens in the optical pickup in accordance with the present invention.
Figure 2B:
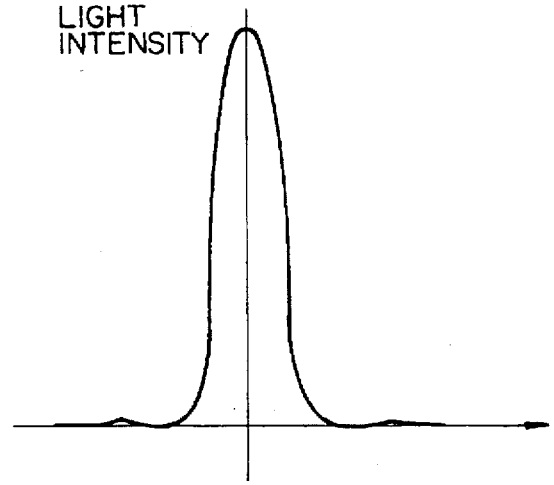
FIG. 2B is a graph of the light intensity distribution.

The light intensity distribution at plane A in such a case is shown in FIGS. 2A and 2B. Only a highly intense spot of laser beam a is produced at the central portion, so that a primary ring around the aforementioned center spot is virtually not formed. FIG. 2B, being a graph showing the light intensity distribution for light focused on the optical disk 1 in terms of height, shows that the center spot of light has a high intensity, while the primary ring has almost no light intensity.

Data is read out from the optical disk 1 by focusing the intense central spot onto a pit of a track to be read out form on the optical disk 1, and allowing the optical detector in the optical pickup to receive the light reflected from the track. In this case, a primary ring is virtually not produced, thus making it possible to prevent cross talk caused by reflected light from an adjacent track.

The distance D of FIG. 1 is considerably greater than the distance between adjacent tracks, and almost none of the laser beams b reflected by the optical disk 1 is incident upon the objective lens 10, so that interference by the laser beams b does not occur.

The central portion of the aforementioned hologram lens 11 is formed differently from the peripheral portions of the face 11. For example, as shown in FIG. 1A, an inclined wall defining a groove formed in a peripheral portion and an inclined wall defining a groove formed in the central portion are formed such that they incline in opposite directions. The grooves may be formed such that those formed at the peripheral portion differ in depth from those formed at the central portion.

When the central and peripheral portions of the hologram lens 11 are formed differently, the laser beam, diffracted by the central portion of the aforementioned hologram lens 11, is focused on the optical disk 1 disposed at plane A, as indicated by the laser beam a in the figure. On the other hand, the laser beams, diffracted by the peripheral portions of the hologram lens 11, illuminate the optical disk 1 disposed at plane A so as to be separated by distance D on the disk 1, as indicated by laser beams b in the figure.

Figure 3:
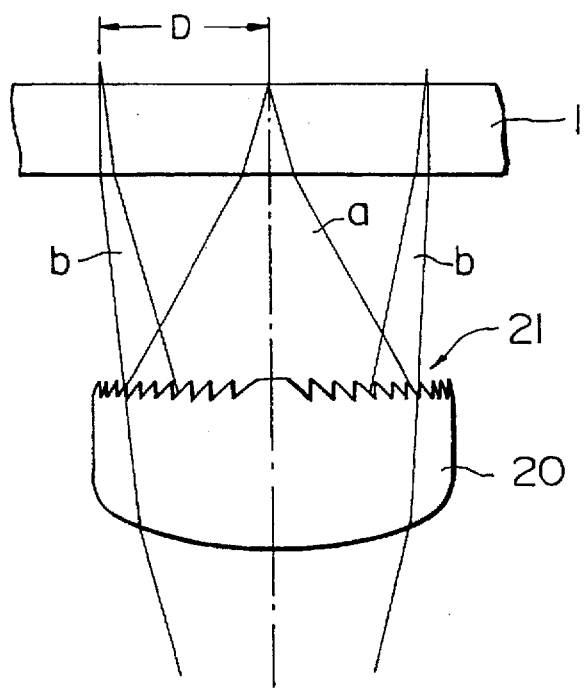
FIG. 3 illustrates a construction of a modification of the objective lens in the optical pickup in accordance with the present invention.

A construction of a modification of an objective lens in an embodiment of the invention is illustrated in FIG. 3.

The objective lens 20 of FIG. 3 has the hologram lens 21 facing the optical disk 1. The laser beam, diffracted by the central portion of the hologram lens 21, is focused on the optical disk 1, as indicated by light beam a in the figure. On the other hand, the light beams, diffracted by the peripheral portions of the hologram lens 21, illuminate the optical disk 1, so as to be separated by distance D on the disk 1, as indicated by laser beams b in the figure.

The central portion of the hologram lens 21 is physically formed differently from the peripheral portions of the face 21. For example, an inclined wall defining a groove formed in a peripheral portion and an inclined wall defining a groove formed in the central portion may be formed such that they incline in opposite directions. The grooves may also be formed such that those formed at the peripheral portion differ in depth from those formed at the central portion.

Accordingly, when the objective lens has a hologram lens 21, the light intensity distribution before light has passed through the objective lens 20 is substantially uniform, as shown in FIG. 1C, whereas the light intensity distribution after light has passed through the objective lens 20 is as a whole reduced, but remains substantially uniform, as shown in FIG. 1B.

The light intensity distribution on the optical disk 1 in such a case is illustrated in FIGS. 2A and 2B. More specifically, as shown in FIG. 2A, only a highly intense spot of laser beam a is formed at the central portion, so that a primary ring around the center spot is virtually eliminated. FIG. 2B, being a graph showing the light intensity distribution for light focused on the optical disk 1 in terms of height, shows that the center spot of laser beam a is highly intense, while the primary ring has almost no intensity.

The highly intense spot formed at the central portion is focused on a pit of a track to be read that is formed on the optical disk 1, and the light reflected from the track is received by the optical detector in the optical pickup, in order to read out data from the optical disk 1. In this case, almost no primary ring is generated, thus making it possible to prevent cross talk caused by light reflected from an adjacent track.

The distance D of FIG. 3 is considerably greater than the distance between adjacent tracks, and almost none of the laser beams b reflected by the optical disk 1 is incident upon the objective lens 10, so that interference caused by the laser beams 2 does not occur.

As can be understood from the foregoing description, according to the objective lens in the optical pickup of the present invention, a hologram lens is formed along the entire surface of the objective lens, and the central portion and the peripheral portion are formed differently, so that the light intensity distributions before and after light has passed through the objective lens can be made uniform, thus preventing cross talk caused by reflected light from an adjacent track.

What is claimed is:

1. An optical pickup, comprising:

an objective lens for focusing light generated by a light source onto a reading out member which includes a plurality of adjacent tracks, wherein each track contains data to be read out, and for directing the light reflected by the reading out member;

wherein said objective lens includes a hologram lens formed over the entire area of one surface thereof, with a central portion of the hologram lens being formed such that light incident upon the central portion of the hologram lens is focused by said objective lens in such a manner as to illuminate a first one of said tracks of the reading out member, and light reflected by the reading out member is incident upon said objective lens; and with a peripheral portion of the hologram lens being formed such that light incident upon the peripheral portion of the hologram lens illuminates a second one of said tracks wherein said first and second tracks are separated by at least one intermediate track, and the light reflected by the second track is not incident upon said objective lens.

2. An optical pickup according to claim 1, wherein the hologram lens is formed on a surface of said objective lens facing the light source.

3. An optical pickup according to claim 1, wherein the hologram lens is formed on a surface of said objective lens facing the reading out member.

4. An optical pickup according to claims 1, 2, or 3, wherein the hologram lens is formed by a plurality of concentric grooves, each of which being defined by a pair of walls, of which one is inclined, such that a direction of inclination of the inclined wall of each of the grooves formed in the central portion of the hologram lens is opposite to a direction of inclination of the inclined wall of each of the grooves formed in the peripheral portion of the hologram lens.

5. An optical pickup according to claims 1, 2, or 3, wherein the hologram lens is formed by a plurality of concentric grooves, each of which being defined by a pair of walls, of which one is inclined, such that a depth of the inclined wall of each of the grooves formed in the central portion of the hologram lens differs from a depth of the inclined wall of each of the grooves formed in the peripheral portion of the hologram lens.

6. A reproducing apparatus, comprising:

an optical pickup for focusing light generated from a light source onto an optical disk which includes a plurality of adjacent tracks, and for receiving the light reflected by the optical disk;

wherein said optical pickup includes an objective lens comprising a hologram lens formed over the entire area of one surface thereof, with a central portion of the hologram lens being formed such that when light incident upon the central portion of the hologram lens is focused by said objective lens and illuminates a first one of said tracks in said plurality of tracks on said optical disk, the light reflected by said optical disk is incident upon said objective lens; and with a peripheral portion of the hologram lens being formed such that when light incident upon a peripheral portion of the hologram lens illuminates a second one of said tracks in said plurality of tracks wherein said first and second tracks are separated by at least one intermediate track, and wherein the light reflected by said optical disk is not incident upon said objective lens.

7. A reproducing apparatus according to claim 6, wherein the hologram lens is formed on a surface of said objective lens facing the light source.

8. A reproducing apparatus according to claim 6, wherein the hologram lens is formed on a surface of said objective lens facing the optical disk.

9. A reproducing apparatus according to claims 6, 7, or 8, wherein the hologram lens is formed by a plurality of concentric grooves, each of which being defined by a pair of walls, of which one is inclined, such that a direction of inclination of the inclined wall of each of the grooves formed in the central portion of the hologram lens is opposite to a direction of inclination of the inclined wall of each of the grooves formed in the peripheral portion of the hologram lens.

10. A reproducing apparatus according to claims 6, 7, or 8, wherein the hologram lens is formed by a plurality of concentric grooves, each of which being defined by a pair of walls, of which one is inclined, such that a depth of the inclined wall of each of the grooves formed in the central portion of the hologram lens differs from a depth of the inclined wall of each of the grooves formed in the peripheral portion of the hologram lens.

* * * * *